(12) United States Patent
Petersen et al.

(10) Patent No.: US 12,313,040 B2
(45) Date of Patent: May 27, 2025

(54) METHOD OF SERVICING A WIND TURBINE ROTOR BLADE

(71) Applicant: Vestas Wind Systems A/S, Aarhus (DK)

(72) Inventors: Aksel Petersen, Ringkøbing (DK); Jack Zhen-zhe Chen, Vejle (DK); Balachandra Udayavara, Chennai (IN); Søren Bjørnsgaard Kristensen, Ringkøbing (DK)

(73) Assignee: Vestas Wind Systems A/S, Aarhus (DK)

( * ) Notice: Subject to any disclaimer, the term of this patent is extended or adjusted under 35 U.S.C. 154(b) by 0 days.

(21) Appl. No.: 18/683,990

(22) PCT Filed: Aug. 12, 2022

(86) PCT No.: PCT/DK2022/050166
§ 371 (c)(1),
(2) Date: Feb. 15, 2024

(87) PCT Pub. No.: WO2023/020671
PCT Pub. Date: Feb. 23, 2023

(65) Prior Publication Data
US 2025/0137440 A1   May 1, 2025

(30) Foreign Application Priority Data
Aug. 16, 2021 (DK) .......................... PA 2021 70408

(51) Int. Cl.
*F03D 80/50* (2016.01)
*F03D 1/06* (2006.01)

(52) U.S. Cl.
CPC ......... *F03D 80/502* (2023.08); *F03D 1/0675* (2013.01); *F05B 2230/80* (2013.01)

(58) Field of Classification Search
CPC ...... F03D 80/50; F03D 80/501; F03D 80/502; F03D 1/0675; F05B 2230/80; E04G 3/24; E04G 3/246
See application file for complete search history.

(56) References Cited

U.S. PATENT DOCUMENTS

| | | |
|---|---|---|
| 2015/0376906 A1 | 12/2015 | Wilson et al. |
| 2016/0356263 A1 | 12/2016 | Schafer et al. |
| 2021/0270246 A1* | 9/2021 | Andersen ................ F03D 80/50 |

FOREIGN PATENT DOCUMENTS

| | | |
|---|---|---|
| DE | 102011077402 A1 | 12/2012 |
| EP | 2908002 A1 | 8/2015 |

(Continued)

OTHER PUBLICATIONS

Danish Patent and Trademark Office, technical examination issued in corresponding DK Application No. PA 2021 70405, dated Feb. 10, 2022.

(Continued)

*Primary Examiner* — Aaron R Eastman
(74) *Attorney, Agent, or Firm* — Wood Herron & Evans LLP (57) ABSTRACT

In a first example there is provided a method of servicing a wind turbine rotor blade. The blade comprises an outer shell defining an interior cavity, and the rotor blade is part of a rotor connected to a wind turbine. The method comprises arranging the rotor such that the 5 blade is in a first orientation, installing a work platform in the interior cavity of the blade when the blade is in the first orientation, and subsequently arranging the blade in a second orientation. The method further comprises using the work platform, when the blade is in the second orientation, to support a technician performing a service operation on the blade.

13 Claims, 8 Drawing Sheets

(56) References Cited

FOREIGN PATENT DOCUMENTS

EP 3587807 A1 1/2020
WO 2018149528 A1 8/2018

OTHER PUBLICATIONS

International Searching Authority, International Search Report and Written Opinion issued in corresponding PCT Application No. PCT/DK2022/050166, dated Nov. 23, 2022.
George Ciocirlan, Nordex N54 2012 in Hamburg, Apr. 14, 2015, XP055979012, URL: https://www/youtube.com/watch?v=IHHdYSN3YxQ (retrieved Nov. 8, 2022.

\* cited by examiner

METHOD OF SERVICING A WIND TURBINE ROTOR BLADE

TECHNICAL FIELD

The present invention relates generally to wind turbines and more specifically to a method of servicing a wind turbine rotor blade.

BACKGROUND

Wind turbine rotor blades are designed to withstand a lifetime of use in harsh weather conditions. However, service operations may be required at some stage during the lifetime of the blade. For example, lightning strikes or high energy collisions could damage an outer shell of the wind turbine blade such that inspection and/or repair work may be required.

Service operations inside the blade are typically carried out with the blade arranged in a substantially horizontal orientation such that technicians may stand and walk on an inner surface of the shell during the service operation. Further, a horizontal orientation is also typically preferred over a vertical orientation for safety reasons because an internal cavity of a vertically-arranged blade may extend downwards substantially uninterrupted for 50 m or more, posing a significant risk of injury in the event of a fall.

In many examples, wind turbine blades are typically removed from the wind turbine for inspection and/or repair work. However, removing a wind turbine blade in the field is very expensive, particularly for offshore wind turbines requiring specialised crane vessels to remove a blade. Further, removing and reattaching a blade is a time consuming operation, leading to significant downtime during which the turbine is out of service. Improvements to methods of servicing a wind turbine blade are therefore required. It is against this background that the present invention has been devised.

SUMMARY

In a first example there is provided a method of servicing a wind turbine rotor blade. The blade comprises an outer shell defining an interior cavity, and the rotor blade is part of a rotor connected to a wind turbine. The method comprises arranging the rotor such that the blade is in a first orientation, installing a work platform in the interior cavity of the blade when the blade is in the first orientation, and subsequently arranging the blade in a second orientation. The method further comprises using the work platform, when the blade is in the second orientation, to support a technician performing a service operation on the blade.

The rotor blade may be arranged in a 3 o'clock or 9 o'clock position in the first orientation such that the blade is substantially horizontal. Additionally or alternatively, the rotor blade may be arranged in a 6 o'clock position in the second orientation such that the blade is substantially vertical.

Arranging the blade in a substantially vertical orientation, i.e. extending substantially downwardly from a hub of the turbine, facilitates service operations that would not be possible in a horizontally-arranged blade without removing the blade form the wind turbine.

For example, when arranged horizontally a wind turbine blade is cantilevered from its root end and the blade is therefore structurally loaded. As such, structural components of the blade, such as the shell and/or any spar components, are typically also structurally loaded when the blade is orientated horizontally. Service operations which could temporarily weaken structural components of the blade, such as repair work requiring the removal of some existing laminate to integrate new laminate material, cannot be performed with the blade attached to the turbine in a horizontal arrangement.

However, arranging a blade connected to the turbine in a substantially vertical orientation in the method of the first example significantly reduces the load on structural components of the blade. Notably, arranging the blade such that it extends substantially vertically downwardly from the hub also changes the direction in which the load acts. Such an arrangement therefore substantially unloads the blade and the structural components in the blade. Service operations such as maintenance or repair works on the blade, including repair work requiring the removal of some existing laminate, can be carried out with the blade still attached to the turbine because the blade is substantially unloaded.

As such, in the method of the first example, work can be performed on the structural components that would otherwise not be possible in a horizontally-arranged blade attached to the turbine. The method therefore enables service operations on the blade without removing the blade from the wind turbine. The method facilitates more efficient service operations that can be completed in a shorter time than a corresponding service operation previously requiring the blade to be removed from the turbine. For example, the time required for detaching and reattaching a blade is saved in the method of the first example because the blade remains attached to the turbine. Further, use of the work platform in a vertically-arranged blade means that a technician may be safety supported on the work platform during the service operation.

The work platform may be in a substantially vertical plane when the rotor blade is in the first orientation. Additionally or alternatively, the work platform may be in a substantially horizontal plane when the rotor blade is arranged in the second orientation. As such the work platform may provide a convenient surface for supporting a technician during a service operation.

The method may further comprise attaching one or more tools required to perform the service operation to the platform when the rotor blade is in the first orientation. The method may further comprise using said tools to perform the service operation when the blade is in the second orientation. As such, the tools may be provided at the work platform ready for use in the service operation, without needing to hoist or lower tools to the platform when the blade is in the second orientation.

The method may further comprise arranging climbing apparatus extending between the work platform and a root end of the rotor blade when the blade is in the first orientation. The method may further comprise using the climbing apparatus to access the work platform when the blade is in the second orientation. The climbing apparatus preferably extends substantially horizontally between the work platform and the blade root in the first orientation. The climbing apparatus may comprise a rope. The climbing apparatus may additionally or alternatively comprise a ladder. Preferably the climbing apparatus comprises a rope ladder.

The rotor blade may comprise a spar component located in the interior cavity of the blade. The method may comprise arranging the work platform between the spar component and the outer shell, or between the spar component and an additional spar component when the blade is in the first orientation. The spar component may be a shear web. In some examples the spar component may be a box spar structure. The additional spar component may be a shear web. As such the method may comprise arranging the work platform between two shear webs.

The method may comprise connecting the work platform to the spar component when the rotor blade is in the first orientation. The work platform is preferably connected to the spar component via at least one hinged connection when the blade is in the first orientation. The hinged connection may reduce the risk of stress concentrations forming as a result of connecting the work platform to the spar component. The method may additionally comprise connecting the climbing apparatus to the spar component when the blade is in the first orientation.

The method may further comprise attaching an ancillary platform kit to the work platform when the rotor blade is in the first orientation. The method may further comprise assembling the ancillary platform above the work platform when the blade is in the second orientation. Attaching the ancillary platform kit in the first orientation means that the kit is provided at platform level in the second orientation thereby avoiding any requirement of lowering and hoisting ancillary platform parts to the platform when the blade is in the second orientation.

The ancillary platform may be connected to the spar component. Preferably, the ancillary platform may be assembled on top of the work platform such that the ancillary platform is supported by the work platform when the blade is in the second orientation. The method may further comprise assembling a plurality of ancillary platforms above the work platform when the blade is in the second orientation. As such, the or each ancillary platform may facilitate support of a technician at various radial positions along the blade during a single service operation.

The method may further comprise removing the work platform from the interior cavity of the rotor blade after completion of the service operation. The work platform may therefore be referred to as a temporary work platform because the platform is preferably only present within the interior cavity during the method of servicing the rotor blade. As such, the platform does not add to the weight of the blade in normal use of the turbine, because it may be removed after completion of the service operation.

The method may further comprise arranging the rotor such that the blade is in the first orientation, and subsequently removing the work platform from the interior cavity of the rotor blade. A simple de-installation of the work platform may therefore be facilitated with the blade still connected to the turbine.

The method may further comprise yawing the wind turbine in dependence on one or more factors during the service operation when the rotor blade is in the second orientation. The wind turbine may be yawed in dependence on factors associated with wind conditions. For example, the wind turbine may be yawed in dependence on factors such as the direction of the prevailing wind and wind speed. The wind load on the blade may therefore be actively managed during the service operation.

Access to the inside of the wind turbine blade may be limited, especially if the turbine comprises an internal partition such as a bulkhead or stiffening plate near the root end of the blade. In such examples, access to the blade interior may only be possible through an access opening, such as a manhole, provided in the internal partition. In preferred examples, a manhole may be substantially small in diameter relative to the size of the blade root in order to maintain the structural advantages of the bulkhead or stiffening plate. The size constraints of the manhole may limit the apparatus that can be taken into the blade for use in a service operation.

Installing the work platform may therefore comprise assembling the work platform from a kit of parts when the rotor blade is in the first orientation. The method may comprise transporting the kit of parts into the interior cavity of the blade through an access opening, e.g. a manhole, provided at or near the root of the rotor blade. The work platform may therefore be referred to as a work platform assembly in some examples because the work platform may be assembled from multiple parts.

In a second example, there is provided a temporary work platform assembly for installation inside a wind turbine rotor blade. The work platform assembly comprises a platform for supporting a person during service or maintenance of the wind turbine blade, and a support structure for supporting the platform. The support structure is adapted for connection to an internal surface of the wind turbine blade. The platform comprises a plurality of panels.

Providing a work platform as a work platform assembly facilitates simple delivery of the platform assembly into the blade in a disassembled state whilst the blade remains attached to the wind turbine. For example, space inside a nacelle and/or hub of a wind turbine may be limited, and providing the work platform as a plurality of separate parts means that each part may be transported into the blade separately. Delivering a work platform into the blade as a plurality of separate parts is particularly preferable in examples where access to the blade interior is further constrained by an access opening, e.g. a manhole, provided at or near the root of the rotor blade. Following delivery into the blade, the work platform assembly may subsequently be assembled within the blade to form a work platform assembly that would otherwise not fit through a manhole.

The platform of the work platform assembly may be of modular construction. For example, the panels may be provided as a plurality of separate panels which may be delivered into the blade separately when the work platform assembly is in a disassembled state. The panels may be configured for arrangement adjacent to one another to form the platform. The platform preferably provides a substantially planar work surface for supporting a person during service or maintenance of the wind turbine blade. Preferably, the platform panels may be rigid platform panels.

Each panel may be configured to abut, or fit into or against, an adjacent panel such that the platform defines a substantially continuous work surface. The platform therefore preferably comprises no gaps between abutting adjacent panels. Such a configuration helps to ensure items, tools or debris from the service operation are contained on the platform and do not fall into the blade interior below the platform.

The support structure may be configured to prop up the platform from below in use. In other words, the support structure may be configured to underpin and support the platform from below in use. The platform, supported from below by the support structure, may therefore be substantially free of obstructions during a service operation.

The support structure may comprise a plurality of interconnected support members. Assembling the support structure from a plurality of support members facilitates delivery of the support members into the blade to form a support structure that may otherwise not be manoeuvrable inside the turbine. The support structure preferably comprises a support bracket configured for connection to the internal surface of the wind turbine blade. The support bracket preferably comprises a plurality of distributed attachment points for connecting the support bracket to the internal surface. The support structure is preferably adapted for connection to the internal surface via the support bracket. The support bracket may therefore distribute the weight of the platform in use to avoid or substantially reduce the risk of any stress concentrations forming in the internal surface.

The support structure may be adapted to form a hinged connection with the internal surface of the wind turbine blade. This may further help to reduce the risk of stress concentrations forming in the internal surface as a result of the connection with the support structure.

The support structure may comprise an oblique support member configured to extend between and transverse to both the internal surface and the platform. The oblique support member is preferably configured for connection to at least one of the internal surface or another support member of the support structure. As such, the oblique support member may increase the stability and load bearing capacity of the support structure. The oblique support member is preferably adapted to form a hinged connection with at least one of the internal surface or another support member of the support structure.

The oblique support member may be extendable. The oblique support member may therefore comprise a plurality of discrete lengths to which the support member may be extended. An extendable support member may be configured to be extended after delivery into the blade, further facilitating delivery of the platform assembly parts into the blade.

Preferably, the support members of the support structure may be rigid support members.

The internal surface of the wind turbine blade may be a surface of a spar component. The support structure may therefore be adapted for connection to the spar component. The spar component may be a shear web. In some examples, the spar component may be a box spar. Preferably, the internal surface of the wind turbine blade is not an inner surface of the outer shell. As such, in some examples the support structure is preferably configured for connection only to a spar component.

The temporary work platform assembly may further comprise a skirt extending around the platform. The skirt may form a barrier or wall extending around the platform. The skirt may help to contain items, such as tool or materials, on the work platform during a service operation. The skirt may be configured to extend from the platform to one or more internal surfaces of the wind turbine blade. Preferably the skirt is therefore configured to close any gaps between the platform and the internal surfaces of the blade surrounding the platform.

The skirt preferably extends transverse to the platform. Preferably the skirt is configured to extend upwards from the platform in use. Preferably only the skirt of the temporary platform assembly is configured to contact the inner surface of the outer shell.

The skirt may comprise a plurality of adaptable skirt sections hingedly coupled to the platform. As such, the work platform assembly may be suitable for use at a plurality of radial positions along the blade, despite the shape of the blade varying with radial position, because the adaptable skirt sections may be arranged differently at different radial positions to extend from the platform to one or more internal surfaces of the wind turbine blade. The skirt sections may be configured to be brought into contact with the inner surface of the outer shell.

The temporary work platform assembly may further comprise an ancillary platform configured for arrangement above the platform. The ancillary platform may be configured to support a service technician at an additional radial position along the blade during a service operation. The ancillary platform is preferably of lightweight construction. The ancillary platform may therefore comprise a discontinuous floor section. The discontinuous floor section of the auxiliary platform may comprise one or more mesh panels, such as a metal grate for example. As such, the floor section may comprise one or more mesh panels. Preferably, the floor section panels of the ancillary platform may be rigid floor section panels.

The temporary work platform assembly may further comprise one or more attachment points configured for fixing one or more tools to the platform assembly. The or each attachment point may be provided in or on the platform. The one or more attachment points may comprise one or more lashing eye bolts.

In the second example, there is also provided a wind turbine blade comprising a temporary work platform assembly as described herein.

The second example also provides a method of installing a temporary work platform assembly inside a wind turbine rotor blade. The method comprises providing a plurality of panels and a support structure at a required location inside the wind turbine blade. The method further comprises connecting the support structure to an internal surface of the wind turbine blade, and arranging the panels with the support structure to form a platform for supporting a person during service or maintenance of the wind turbine blade.

Connecting the support structure to an internal surface of the wind turbine blade may comprise connecting the support structure to a spar component inside the wind turbine blade. The spar component may be a shear web. In some examples, the spar component may be a box spar.

In preferred examples, connecting the support structure to an internal surface of the wind turbine comprises connecting the support structure to a surface that is not an inner surface of the outer shell. As such, in some examples, the support structure may be connected to a spar component only, i.e. such that the work platform assembly is supported only by the spar component. Connecting the support structure to the spar component only, and not to an inner surface of the shell, may help to ensure that the shell is not damaged or disturbed in any way that could introduce stress concentrations in the shell in normal use of the blade.

The method may comprise installing the temporary work platform assembly between the spar component and an outer shell of the wind turbine blade. Alternatively, the method may comprise installing the temporary work platform assembly between the spar component and an additional spar component inside the wind turbine blade. In some examples the method may therefore comprise installing the temporary work platform assembly between two mutually-opposed shear webs.

The temporary work platform assembly may be installed in-situ inside a wind turbine rotor blade attached to a wind turbine. The method may comprise installing the temporary work platform assembly inside a wind turbine blade having a blade root diameter greater than 2 m. Such blades may comprise a partition, such as a bulkhead or stiffening plate, provided at or near a root of the blade, such as in pitch bearing of the blade. As such, a work platform assembly as described herein may be installed in such a blade by separately delivering parts of the platform assembly through a manhole in the partition to form a work platform that would otherwise not fit through the manhole.

The method may further comprise installing the temporary work platform assembly inside the wind turbine blade as described with reference to the method of servicing a wind turbine rotor blade in the first example. As such the method may further comprise installing the temporary work platform assembly inside the wind turbine blade when the blade is arranged in a substantially horizontal orientation. The temporary work platform assembly is preferably used to support a person during service or maintenance of the wind turbine blade when the blade is arranged in a substantially vertical orientation.

Providing the plurality of panels and the support structure at the required location inside the wind turbine blade may comprise delivering the panels and support structure into the wind turbine blade through a personnel access opening, such as a manhole, in a bulkhead or plate at or near the root of the wind turbine blade. The manhole may be any suitable shape. For example, the manhole may be polygonal, such as square or rectangular shaped for example. Alternatively, the manhole may be substantially elliptical. In preferred examples, the manhole may have a maximum width of 1 m or less. The manhole may have a minimum width of 0.6 m to facilitate safe access for personnel through the manhole. In some examples, the manhole may be substantially circular. The manhole may therefore have a maximum diameter of 1 m or less. In preferred examples, the manhole may have a minimum diameter of 0.6 m to facilitate safe access for personnel through the manhole.

The method may comprise removing the temporary work platform assembly from the blade following completion of a service operation in which the platform was used to support a person. As such, the provision of the work platform assembly preferably does not increase the weight of the wind turbine blade in normal use, i.e. when no service operation is in progress.

The method may further comprise arranging climbing apparatus extending between the platform and a root of the wind turbine blade. The method may further comprise connecting the climbing apparatus to the internal surface of the wind turbine blade. This may help to improve the stability of the climbing apparatus in use.

The method may further comprise attaching one or more tools to the temporary work platform assembly.

The method may further comprise attaching an ancillary platform kit to the temporary work platform assembly. The method may further comprise assembling an ancillary platform above the platform when the blade is arranged in a substantially vertical orientation.

Performing service operations with the blade arranged vertically presents new challenges not previously considered in conventional service operations where the blade is arranged horizontally. As described above, an interior cavity of a vertically-arranged blade may extend downwards over a great length, and access to the cavity may be facilitated by an access opening, such as a manhole, defined in a partition located at or near a root end of the rotor blade. A manhole may typically be covered for safety when access to the blade interior is not required. However, it may be necessary for the manhole to be uncovered to provide access to the blade interior when conducting a service operation inside the blade, and additional safety measures may therefore be required.

In a third example there is provided a wind turbine comprising a rotor blade, a partition located at or near a root end of the rotor blade, a manhole defined in the partition, and a collar at least partially surrounding the manhole.

The collar preferably provides a wall or barrier at or near to the perimeter of the manhole. As such, the collar may prevent tools or other items from being accidentally kicked into and through the manhole when the manhole is uncovered. The collar may therefore prevent items from falling down into the blade cavity during a service operation. Particularly if service personnel are working inside the blade, i.e. through the manhole, providing a collar at least partially surrounding the manhole may reduce the risk of items being accidentally kicked into the manhole and onto the service personnel from above.

The partition may be substantially planar. The collar may extend out of the plane of the partition. For example, the collar may extend upwardly from the surface of the partition. The collar preferably extends substantially perpendicularly to the plane of the partition to provide a barrier or wall.

The partition may function as a work platform when the blade is arranged in a substantially vertical orientation, i.e. extending substantially vertically downwards from a hub of the wind turbine. For example, the partition may define a surface on which service personnel may stand whilst performing a service operation or whilst assisting other service personnel. The collar may extend upwardly from a surface of the partition when the blade extends vertically downwardly from the hub of the wind turbine.

The partition may be a bulkhead arranged inside the blade or inside a hub of the wind turbine. Alternatively the partition may be a plate of a pitch bearing. For example, the partition may be a stiffening plate of a pitch bearing. The wind turbine may comprise a pitch actuator connected to the plate of the pitch bearing in some examples.

The collar is preferably provided on a hub-facing side of the partition. In other words, the collar is preferably provided on an inboard surface of the partition. As such the collar is preferably provided on a surface of the partition on which service personnel may stand and on which tools may be placed.

The collar may be removable. In some examples, the collar may be releasably fastened to the partition. For example, the collar may be bolted to the partition. The collar may be a temporary collar for use in a method of servicing a wind turbine rotor blade. As such, the collar may be removed from the partition after use. Alternatively, the collar may be integrally formed with the partition.

In some examples, the collar may be formed of a plurality of collar sections. Forming to collar of a plurality of collar sections may facilitate transport of the collar to the manhole in examples where the collar is removable.

The collar may extend around a complete perimeter of the manhole. The collar preferably forms a substantially continuous wall or barrier around the manhole. For example, the entire perimeter of the manhole may be enclosed by the collar. Such a configuration ensures that the manhole is guarded from all directions to ensure that tools or other items accidentally kicked or dropped on the partition may be blocked by the collar.

In examples where the collar is formed of a plurality of collar sections, such collar sections are preferably arranged such that there are no gaps between adjacent collar sections. For example, adjacent collar sections may be connected together. Alternatively or additionally, adjacent collar sections may be arranged to abut one another. As such, in examples where the collar is formed of a plurality of sections, the manhole may still be guarded from all directions in preferred examples.

The collar is preferably configured to have substantially the same shape as the manhole to maximise the space available for traversing through the manhole and the collar. For example, the manhole may be substantially circular and the collar may form a substantially annular structure.

An upper edge of the collar may comprise a rounded cross-sectional profile. Such a rounded upper edge may reduce friction and wear on safety ropes passing through the collar and manhole to service personnel within in the blade cavity below the manhole.

An upper portion of the collar may be structurally reinforced in some examples. For example, the upper portion of the collar may comprise a thickened rim. A thickened rim may increase the structural rigidity of the collar to prevent buckling in case of contact with a technician or with an item impacting the collar. A portion of the rim preferably extends radially away from the manhole. Such a portion may further help to discourage items contacting the collar from moving up and over the collar into the manhole. A lower portion of the collar may comprise a flange. The flange of the collar may be arranged against the partition. The flange preferably extends radially away from the manhole. The flange may increase the stability of a removable collar.

The collar may be formed of a polymer material. In particular, if the collar is a removable collar, forming the collar of a polymer material may provide a lightweight collar that can be easily transported to, and arranged with, the manhole.

In the third example there is also provided a method of servicing a wind turbine rotor blade. The method comprises providing a wind turbine having a rotor blade connected to a hub, and a partition located at or near a root end of the rotor blade, and a manhole defined in the partition. The method further comprises providing a collar, and arranging the rotor blade such that it extends vertically downwardly from the hub. The method further comprises arranging the collar on the partition such that the collar at least partially surrounds the manhole and extends upwardly from a surface of the partition when the blade extends vertically downwardly from the hub. The method further comprises performing a service operation on the blade with the blade extending vertically downwardly.

The rotor blade may be arranged such that it extends vertically downwardly from the hub before the collar is arranged on the partition. For example, if the wind turbine comprises a pitch drive mechanism connected to the partition, it may be preferable to arrange the collar after arranging the blade vertically to ensure that the pitch drive mechanism is not obstructed by the collar in use. In other examples, the collar may be arranged on the partition before the rotor blade is arranged such that it extends vertically downwardly from the hub.

The method may further comprise releasably fastening the collar to the partition. For example, the method may comprise releasably fastening the collar to the partition by means of a bolted connection. The method preferably comprises releasably fastening the collar to the partition prior to service personnel traversing through the manhole to perform the service operation. The method may further comprise removing the collar from the partition following completion of the service operation.

The collar may comprise a plurality of collar sections, and the method may comprise arranging the collar sections on the partition to form a collar at least partially surrounding the manhole. The method may further comprise connecting a plurality of collar sections together to form the collar, and subsequently arranging the collar on the partition.

It will be appreciated that optional features described with reference to one of the examples herein may be readily combined with any other example described herein and the optional features thereof. The optional features of each example are not repeated with reference to each other example purely for reasons of conciseness, but it will be appreciated that the features and examples disclosed herein may be combined in some other examples.

For example, it will be appreciated that the temporary work platform assembly of the second example may be used in the method of servicing a wind turbine rotor blade according to the first example discussed above. As such, all features described herein in connection with the temporary work platform assembly of the second example may be utilised in the servicing method according to the first example. Likewise, it will be appreciated that any features of the platform discussed in the first example are also relevant to the work platform assembly discussed in the second example.

It will also be appreciated that the wind turbine blade in the second example may be serviced in accordance the method of servicing a wind turbine rotor blade according to the first example discussed above.

It will also be appreciated that the method of servicing a wind turbine rotor blade in accordance with the first example may further include the method of installing a temporary work platform assembly of the second example discussed above. As such, all features described herein in connection with the method of the second example may be utilised in the servicing method according to the first example.

It will also be appreciated that the rotor blade of the wind turbine in the third example may be serviced in accordance with the method of servicing a wind turbine rotor blade according to the first example discussed above. As such, all features described herein in connection with the wind turbine of the third example may be present in the servicing method according to the first example.

It will also be appreciated that the method of servicing a wind turbine rotor blade in accordance with the first example may further include the features of the method of servicing a wind turbine blade in the third example discussed above. As such, all features described herein in connection with the method of the third example may be utilised in the servicing method according to the first example. For example, the method of the first example may include arranging a collar on a partition in a wind turbine such that the collar at least partially surrounds a manhole.

It will also be appreciated that the temporary work platform assembly of the second example may be installed in the wind turbine in the third example discussed above.

It will also be appreciated that the temporary work platform assembly of the second example may be used in the method of servicing a wind turbine rotor blade according to the third example discussed above. As such, all features described herein in connection with the temporary work platform assembly of the second example may be utilised in the servicing method according to the third example.

It will also be appreciated that the wind turbine blade of the second example may be the rotor blade of the wind turbine of the third example discussed above. As such, all features described herein in connection with the wind turbine blade of the second example may be equally present in the rotor blade of the wind turbine blade according to the third example. Likewise, it will be appreciated that any features of the rotor blade discussed in the third example are also relevant to the wind turbine blade discussed in the second example.

It will also be appreciated that the wind turbine blade in the second example may be serviced in accordance the method of servicing a wind turbine rotor blade according to the third example discussed above.

It will also be appreciated that a temporary work platform may be installed inside the wind turbine of the third example in accordance with the method of installing a temporary work platform of the second example discussed above.

It will also be appreciated that the method of servicing a wind turbine rotor blade in accordance with the third example may further include the method of installing a temporary work platform assembly of the second example discussed above. As such, all features described herein in connection with the method of the second example may be utilised in the servicing method according to the third example.

It will also be appreciated that features from one example may be combined with features of more than one other example. As such, it will be appreciated that the combinations of features provided explicitly above are not mutually exclusive, indeed it is explicitly intended that some further examples may include features from all of the examples discussed above. Where features of one example are not repeated in relation to another example, this is purely for reasons of conciseness.

BRIEF DESCRIPTION OF THE DRAWINGS

Embodiments of the present invention will now be described by way of non-limiting example only, with reference to the accompanying figures, in which.

DETAILED DESCRIPTION

Figure 1A:
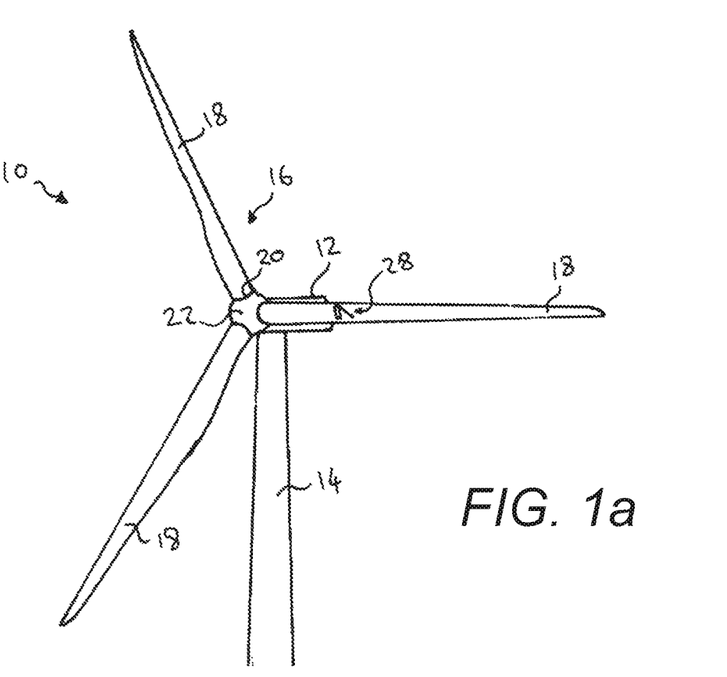
FIG. 1a shows a wind turbine comprising a rotor blade arranged in a substantially horizontal orientation and a temporary work platform assembly installed inside the blade.
Figure 1B:
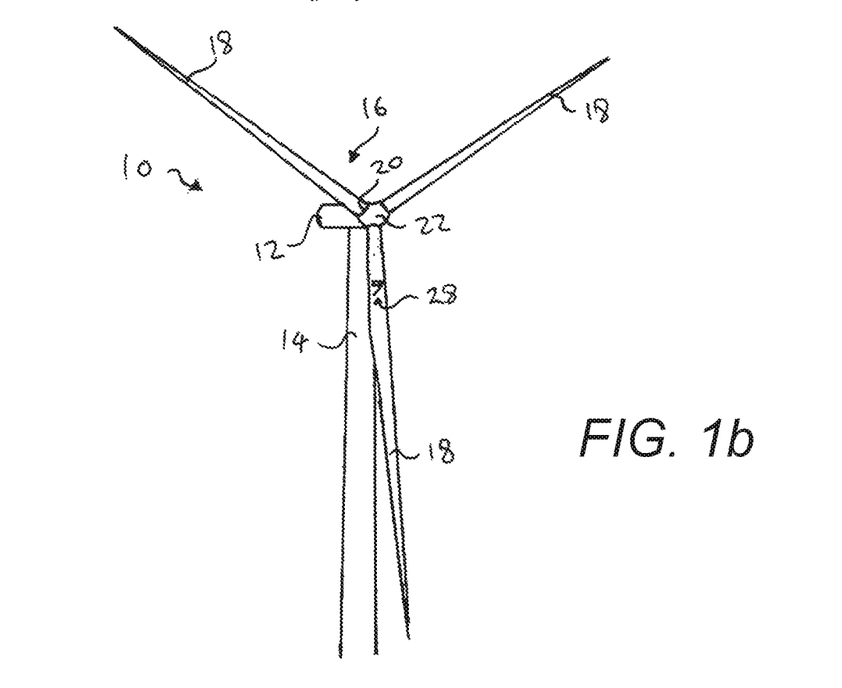
FIG. 1b shows the wind turbine with the rotor blade arranged in a substantially vertical orientation and extending downwardly from a hub of the turbine.

FIGS. 1a and 1b show a utility-scale wind turbine 10 comprising a nacelle 12 supported at the top of a tower 14. A rotor 16 is rotatably coupled to the nacelle 12, and the rotor 16 comprises a plurality of wind turbine blades 18 attached at their respective root end 20 to a central hub 22. The wind turbine blades 18 comprise an outer shell 24 defining an interior cavity 26 (shown in FIGS. 2 to 7). As described by way of background above, service operations such as inspection and/or maintenance work may be required inside the interior cavity 26 at some stage during the lifetime of the blade 18. As will be described in more detail below, a method of servicing a wind turbine blade 18 may comprise installing a work platform 28 inside the blade 18, i.e. inside the interior cavity 26, as shown in FIGS. 1a and 1b. For example, the work platform 28 may be installed inside the interior cavity 26 between a spar component 42 and a trailing edge of the shell 24 (as shown in FIGS. 5 and 6), between multiple spar components 42 (not shown), or between a spar component 42 and a leading edge of the shell 24 (not shown).

Referring initially to FIG. 1a, the work platform 28 may be installed inside the wind turbine blade 18 with the blade arranged in a first orientation. For example, the rotor 16 may be rotated to arrange the blade 18 in a 3 o'clock position such that the blade 18 is substantially horizontal. The substantially horizontal orientation of the wind turbine blade 18 facilitates a relatively simple installation process because technicians may stand and walk on an inner surface of the blade shell 24 whilst installing the work platform 28.

Following installation of the work platform 28 in the first orientation, the blade 18 may then be arranged in a second orientation in which the work platform 28 is used to support a technician performing a service operation on the blade 18. As shown in FIG. 1b, the blade 18 may be arranged in a 6 o'clock position in the second orientation such that the blade 18 is substantially vertical.

Arranging the blade 18 vertically, i.e. extending substantially downwardly from the hub 22, significantly reduces the structural loads on the blade 18 in comparison to a horizontal arrangement. The work platform 28 also provides a level and stable surface to safely support technicians during a service operation. As such, use of the work platform 28 with the blade 18 arranged vertically safely facilitates service operations without requiring the blade 18 to be removed from the wind turbine 10.

Figure 4:
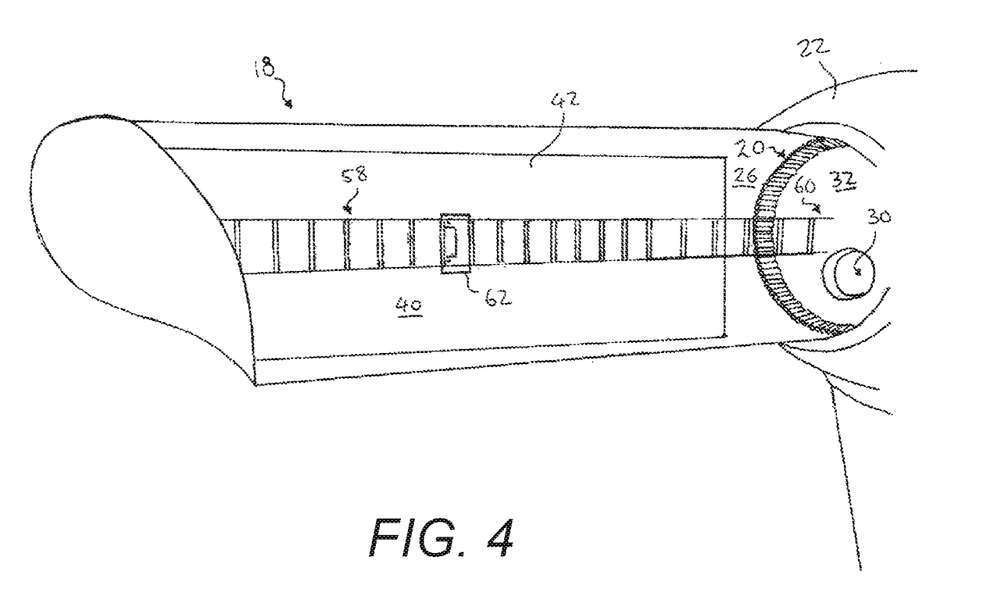
FIG. 4 shows climbing apparatus arranged to extend between the platform and a root of the wind turbine blade.
Figure 5:
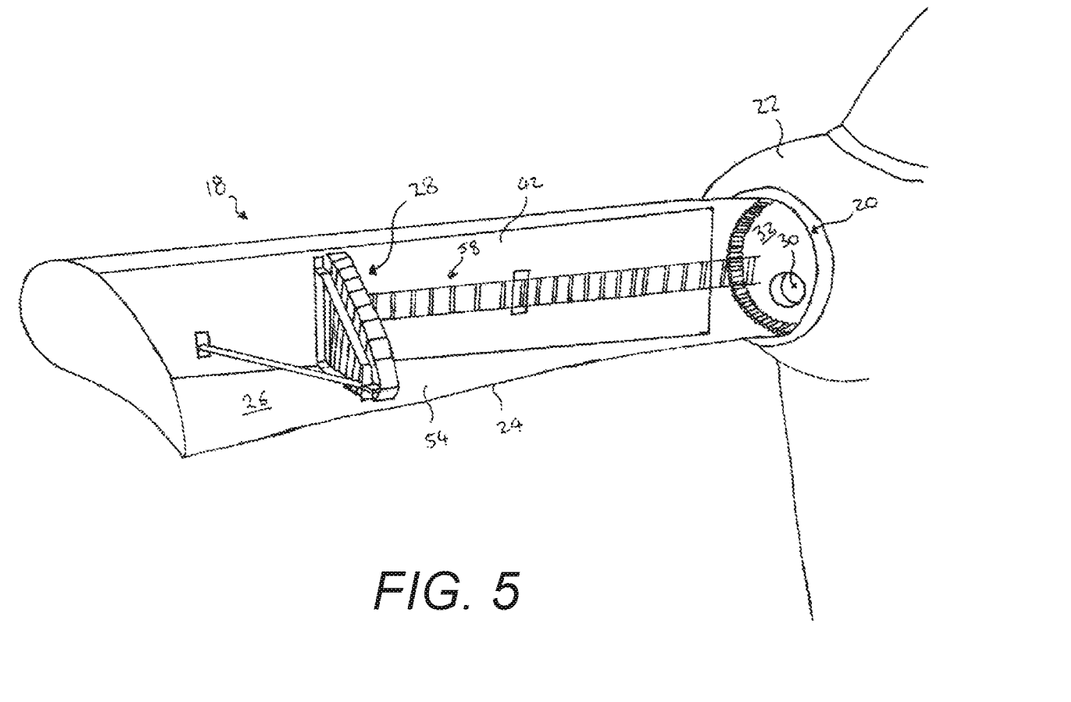
FIG. 5 shows a schematic cutaway view of the horizontally-arranged wind turbine blade with the temporary work platform assembly installed therein.
Figure 6:
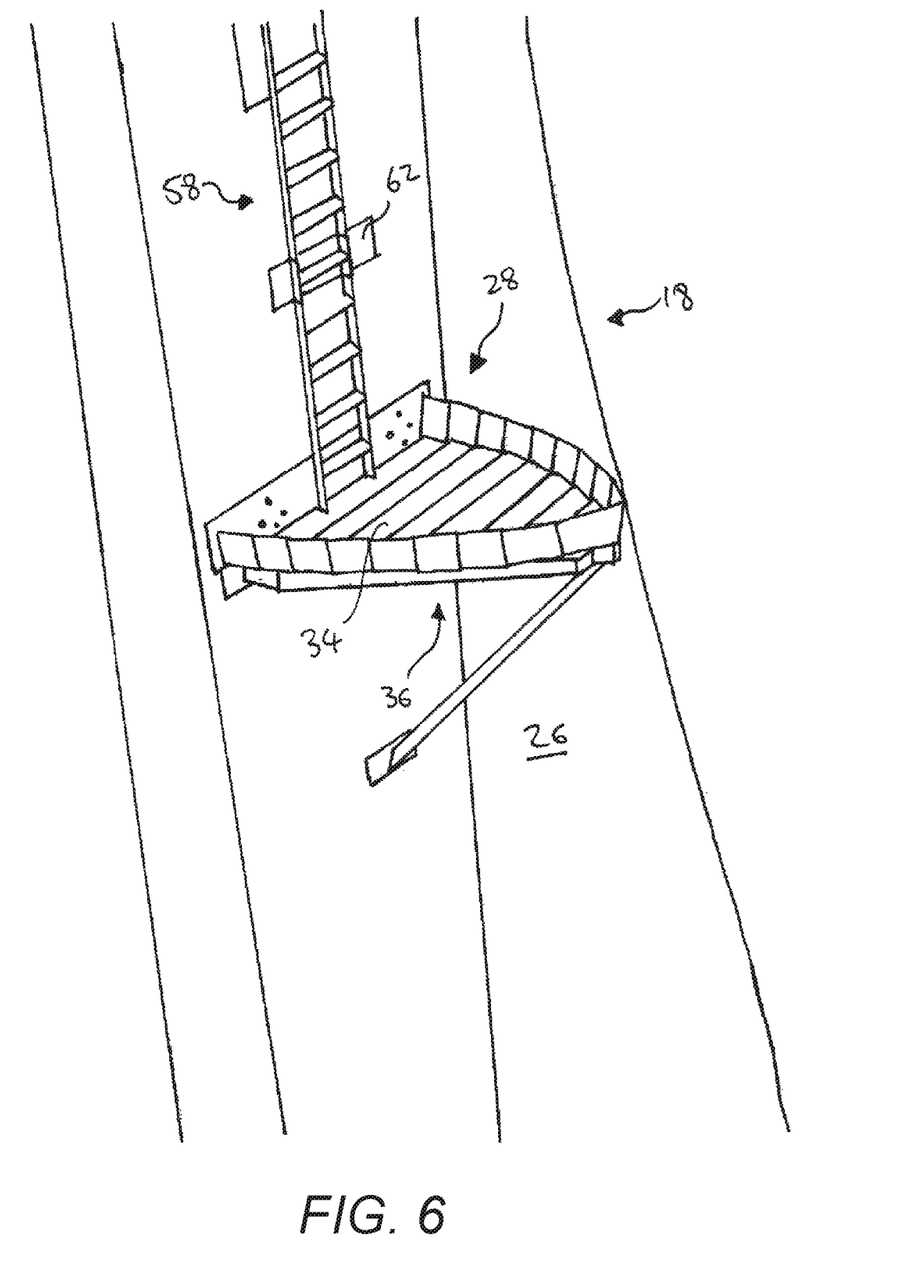
FIG. 6 shows a schematic cutaway view of the blade arranged vertically with the platform inside the blade.
Figure 8:
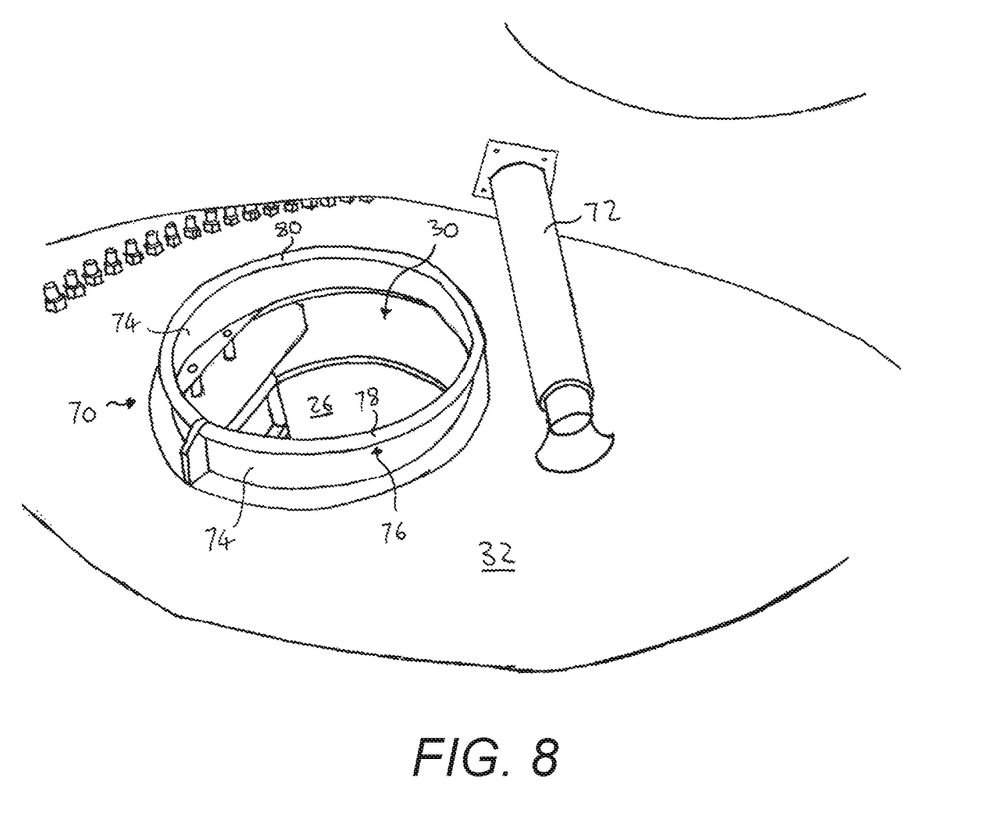
FIG. 8 shows a collar surrounding a manhole defined in a plate of a pitch bearing to guard the manhole during a service operation on the blade.

As shown in FIGS. 4 and 5, access to an interior cavity 26 of the wind turbine blade 18 may be facilitated through an access opening 30, such as a manhole, defined in a partition 32 at or near the root end 20 of the blade 18. The manhole 30 may be defined in a partition 32 such as a bulkhead arranged inside the blade 18 or inside the hub 22, or as shown in FIG. 8 the manhole 30 may be defined in a plate of a pitch bearing, for example. Access openings or manholes 30 may be small in diameter relative to the root end 20 of the blade 18 to maintain the structural benefits of a bulkhead or bearing plate 32. For example, the manhole 30 may have a maximum diameter of 1 m or less to minimise the effect of the manhole 30 on the structural capacity of the partition 32. In preferred examples, the manhole 30 may have a minimum diameter or width of 0.6 m or more to facilitate safe entry and exit through the manhole 30 for a service technician wearing with protective safety equipment. However, an access opening 30 such as a manhole may limit the size of apparatus that can be taken into the blade 18 for installation in some examples.

The work platform 28 may therefore be assembled from a kit of parts in some examples. Preferably, the kit of parts is configured to fit through the manhole 30 for delivery into the internal cavity 26. Installing the work platform 28 may therefore comprise delivering a kit of parts into the internal cavity 26 of the blade 18 through the manhole 30, and assembling the work platform 28 from the kit of parts inside the blade 18. As such, the work platform 28 may be equally referred to as a work platform assembly 28. Such a configuration advantageously facilitates delivery of the kit of parts into the interior cavity 26 of the blade 18 whilst the blade 18 remains attached to the wind turbine 10.

Assembling the work platform assembly 28 from a kit of parts means that the platform assembly 28 can be delivered into the blade 18 through the manhole 30 in a disassembled state before being assembled within the blade 18 to form a work platform assembly 28 that would otherwise not fit through a manhole 30.

Features of the work platform assembly 28 and method for installing the work platform assembly 28 inside the wind turbine blade 18 will now be described in more detail with reference to the remaining figures.

Figure 2:
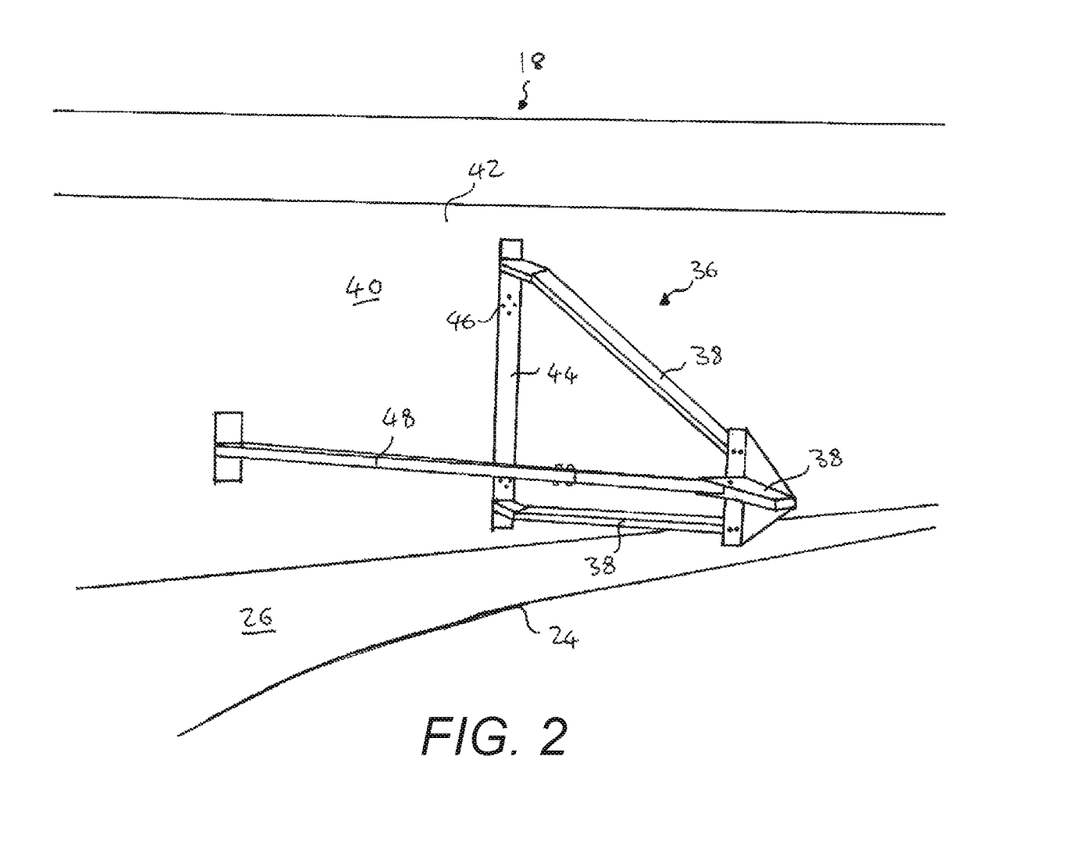
FIG. 2 shows a support structure of the temporary work platform assembly installed inside the wind turbine blade.

The work platform assembly 28 may comprise a platform 34 and a support structure 36 configured to support the platform 34 in use. With reference to FIG. 2 for example, the support structure 36 may comprise a plurality of support members 38. The support members 38 may be connected together inside the blade 18 to form the support structure 36. Such an installation method means that each support member 38 can be separately transported into the blade 18 through the manhole 30 before being assembled at the required radial position within the blade 18.

In some examples, the support structure 36 may be adapted for connection to an internal surface 40 of the wind turbine blade 18. For example, the blade 18 may comprise a spar component 42, such as a shear web or a box spar. The support structure 36 may therefore be configured for connection to the spar component 42. Connecting the support structure 36 to an internal surface 40 of the wind turbine blade 18 may increases the stability and load bearing capacity of the platform assembly 28.

The support structure 36 preferably comprises a bracket 44 via which the support members 38 are connected to the internal surface 40 of the blade 18. Such a bracket 44 may comprise a plurality of distributed attachment points 46 to distribute the weight of the platform assembly 28 in use and to thereby avoid forming stress concentrations in the surface 40 to which the support structure 36 is connected.

In preferred examples, the support structure 36 may be adapted such that one or more connections between the support structure 36 and the internal surface 40 are hinged connections. As such, in some preferred examples, the support structure 36 may be hinged relative to the internal surface 40. A hinged connection may allow the platform assembly 28 to move relative to the internal surface 40 in situations where the surface 40 moves or flexes when the blade 18 is rearranged between orientations with the platform assembly 28 installed. In particular, a hinged connection may substantially minimize the risk of stresses forming in the support structure 36 and/or internal surface 40 as a result of their mutual connection when the blade 18 is rearranged between horizontal and vertical orientations.

Figure 3:
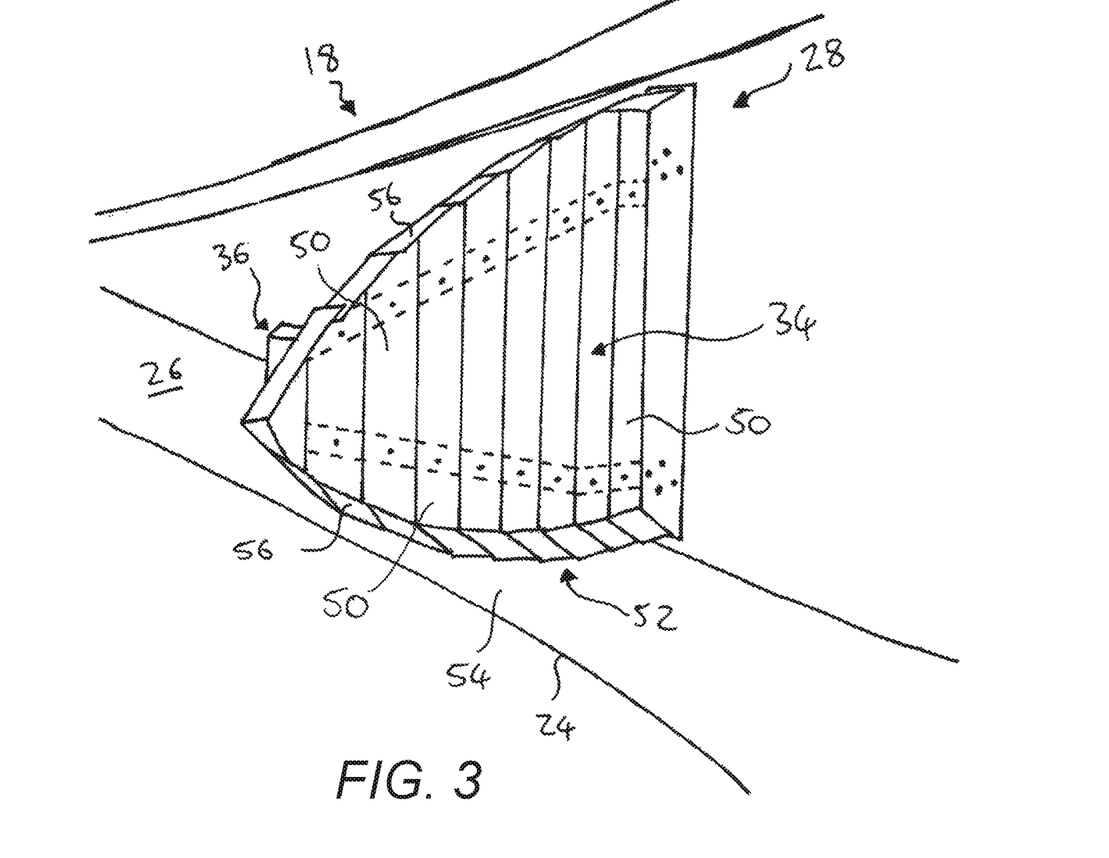
FIG. 3 shows a platform arranged with the support structure inside the blade.

The support structure 36 may further comprise an oblique support member 48 configured to extend between the internal surface 40 and the platform 34 (shown in FIG. 3). The oblique support member 48 is preferably configured to extend transverse to both the internal surface 40 and the platform 34 when assembled. As such, the oblique support member 48 may increase the stability and load bearing capacity of the support structure 36. At least one end of the oblique support member 48 is preferably configured to form a hinged connection. For example, the oblique support member 48 may be configured to form a hinged connection at one end with the internal surface 40. Alternatively or additionally, the oblique support member 48 may be configured to form a hinged connection at its other end with one or more other support members 38 of the support structure 36. As described above, such hinged connections may substantially minimise the risk of stresses forming when the blade 18 is rearranged with the platform assembly 28 installed therein.

The oblique support member 48 may be extendable between a plurality of discrete lengths to simplify delivery of the support member 48 into the blade 18. For example, the oblique support member 48 may be telescopically extendable. Maneuvering a long support member 48 through the turbine 10 and into the blade 18 may be cumbersome or physically impossible. However, a support member 48 that can be extended once delivered into the blade 18 may overcome the constraints of delivering the support member 48 into the blade 18 whilst still providing a long support member of the requisite length. Similarly, one or more other support members 38 of the support structure 36 may be extendable.

With reference now also to FIG. 3, the platform assembly 28 comprises a platform 34 for supporting a person during service or maintenance of the wind turbine blade 18. The platform 34 preferably comprises a plurality of panels 50 which are arranged inside the blade 18 to form the platform 34. Forming the platform 34 from a plurality of panels 50 facilitates the transport and delivery of a platform 34 into the blade 18 through a manhole 30 that would otherwise constrain the size of equipment that can be taken into the blade 18.

In some examples, the panels 50 may be pre-connected before being arranged inside the blade 18 to form the platform 34. For example, the plurality of panels 50 may be configured to be hingedly connected to one another such that the platform 34 can be unfolded inside the blade 18 to form the platform 34. However, in preferred examples, the platform 34 may be of modular construction, and may therefore comprise a plurality of separate panels 50. As such, if so required, each of the panels 50 may be transported and delivered separately into the interior cavity 26 to most effectively facilitate simple delivery of the panels 50.

The panels 50 are preferably directly or indirectly releasably connected to the support structure 36. This provides a stable and secure platform 34 for supporting one or more technicians during the service operation. The panels 50 may be releasably connected to the support structure 36 via mechanical fastenings such as bolts for example. The platform 34 is therefore preferably configured for simple disassembly after use in the service operation.

When arranged together, the panels 50 preferably define a substantially planar work surface. With the blade 18 in the first orientation, the platform 34 may be in a substantially vertical plane. However, with the blade 18 arranged in the second orientation for use during the service operation, the platform 34 is preferably in a substantially horizontal plane, as shown in FIG. 6 for example.

The panels 50 may be configured for arrangement adjacent to one another to form the platform 34, as shown in FIG. 3. Each of the panels 50 may be configured to abut, or fit into or against, an adjacent panel 50 such that the platform 34 defines a substantially continuous work surface. As such, the platform 34 preferably comprises no gaps between adjacent panels 50 to ensure that all tools, materials or debris from the service operation are contained on the platform 34 and do not fall down into the remainder of the internal cavity 26 below the platform 34 in use. Similarly, the panels 50 themselves are preferably continuous, i.e. not comprising gaps, to prevent items from falling through the panels 50 and into the blade cavity 26 below.

The platform assembly 28 may further comprise a skirt 52 extending around the platform 34 to help ensure that no items fall down into the interior cavity 26 below the platform 34 in use. The skirt 52 preferably extends upwards from, i.e. transverse to, the platform 34 in use. As such, the skirt 52 may form a wall or barrier around a periphery of the platform 34 to contain items on the platform 34. The skirt 52 may prevent items or tools that are accidentally kicked or moved on the platform 34 from falling off the platform 34 and into the cavity 26 below the platform assembly 28.

In some examples, the skirt 52 may be configured to extend from the platform 34 to one or more internal surfaces 54 of the wind turbine blade 18, such as an internal surface 54 of the outer shell 24. As such, the skirt 52 may be configured to close any gaps between the platform 34 and the internal surfaces 54 of the blade 18. The skirt 52 may therefore help to effectively divide the cavity 26 above and below the platform 34. Advantageously, the skirt 52 may therefore help to ensure that items, tools or debris from above the platform 34 may not pass into the cavity 26 below the platform 34, even if accidentally dropped from above the skirt 52.

In some preferred examples, the skirt 52 may comprise a plurality of adaptable skirt sections 56. For example, the skirt sections 56 may be hinged relative to the platform 34 such that the skirt sections 56 can each be arranged to extend from the platform 34 to an internal surface 54 of the blade 18 to close any gaps between the platform 34 and the internal surfaces of the blade surrounding the platform 34. The adaptable skirt sections 56 make the platform assembly 28 suitable for use at a plurality of different radial positions inside the blade 18, despite the shape of the shell 24 being different at different radial positions along the blade 18. The adaptable skirt sections 56 may each be arranged at different angles relative to the platform 34 at different radial positions along the blade 18 to extend to the internal surfaces 54 and close any gaps between the platform 34 and the internal surfaces 54.

As shown in FIG. 4, climbing apparatus 58 may be arranged to extend between the platform assembly 28 and the root end 20 of the rotor blade 18. The climbing apparatus 58 is preferably arranged whilst the blade 18 is in the horizontal orientation for ease of installation. At least a rootmost end 60 of the climbing apparatus 58 is preferably releasably fixed to part of the wind turbine 10. For example, the climbing apparatus 58 may be releasably fixed to an internal surface of the blade 18, a spar component 42, or the hub 22.

In preferred examples, the climbing apparatus 58 may comprise one or more rope ladders arranged between the platform assembly 28 and the blade root 20. A rope ladder 58 may provide an advantageous compromise between portability and stability or safety of use when accessing the platform 34. For example, a rope ladder 58 can be rolled up for transport and delivery into the blade 18 whilst providing a fast and safe method for accessing the platform 34 when unrolled. In some examples, the climbing apparatus 58 may be connected to an internal surface 40, such as the spar component 42, via a bracket 62 for increased stability during use.

FIG. 5 shows the platform assembly 28 installed inside the wind turbine blade 18 whilst the rotor 16 is arranged such that the blade 18 extends substantially horizontally from the hub 22. As shown in FIG. 5, in some examples the platform assembly 28 may be installed between the spar component 42 and the inner surface 54 of the shell 24. Such an arrangement may be advantageous for service operations requiring access to the shell 24. Preferably only the skirt 52 or skirt sections 56 (where included) may be in contact with the inner surface 54 of the shell 24 following installation of the platform assembly 28 in the blade 18. In examples not including a skirt 52 or skirt sections 56, the platform assembly 28 is preferably installed inside the wind turbine blade such that the platform assembly 28 does not contact the inner surface 54 of the shell 24. Such an installation avoids any risk of damage to, or deformation of, the shell 24 that could lead to stress concentration during normal use of the blade 18.

In other examples, the blade may comprise a main spar component 42 and an additional spar component (not shown), such as a trailing edge shear web for example. As such, the platform assembly 28 may be installed between two spar components inside the wind turbine blade 18. For example the work platform assembly 28 may be used to support a technician during inspection and/or servicing of a spar component 42. A work platform assembly 28 as described herein may be adapted for installation at any required radial position inside the blade 18 for supporting a technician during a service operation.

In some examples, the platform assembly 28 may comprise one or more attachment points (not shown) configured for releasably fixing one or more tools to the platform assembly 28. Advantageously, one or more tools required for the service operation may be fixed to the platform assembly 28 by means of the attachment points when the blade 18 is arranged in a horizontal orientation. When the blade 18 is subsequently rearranged into a vertical orientation for the service operation, the tools fixed to the platform assembly 28 are conveniently already provided with the platform assembly 28, ready for use. Fixing the tools to the platform assembly 28 in the horizontal orientation therefore avoids or substantially minimises the need to hoist and lower tools between the hub 22 and the platform assembly 28 in the vertically-arranged blade 18 for use in the service operation.

Following installation of the platform assembly 28, the blade 18 may be moved from the horizontal orientation to a substantially vertical orientation with the platform assembly 28 installed therein, as shown in FIG. 6. The platform 34 is therefore preferably arranged in a substantially horizontal plane for use in supporting a technician during a service operation in the vertically arranged blade 18. Access to the platform 34 from the hub 22 may be facilitated by the climbing apparatus 58 as previously described.

In an in-use arrangement, i.e. with the blade 18 extending substantially vertically downwardly from the hub 22, the platform 18 is preferably propped up, or underpinned, from below by the support structure 36. Such a configuration may advantageously ensure that the platform 34 is substantially free from obstructions during the service operation, because the apparatus for supporting the technician is arranged below the platform 34.

Figure 7:
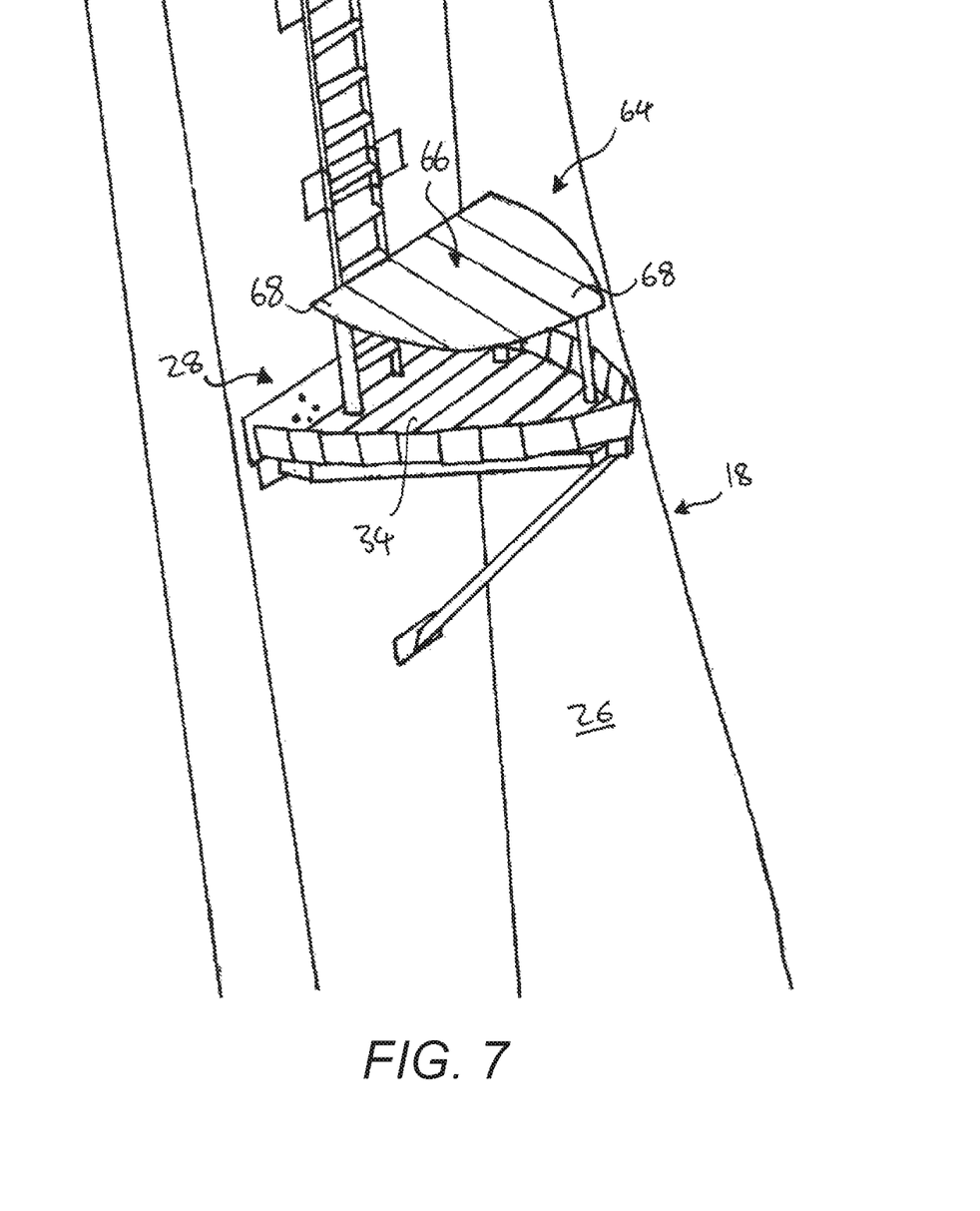
FIG. 7 shows an ancillary platform assembled above the platform with the blade in the vertical orientation.

FIG. 7 shows an ancillary platform 64 which may be assembled above the platform 34 inside the blade 18 from a kit of parts when the blade 18 is arranged in a vertical orientation. In preferred examples, the ancillary platform 64 may be supported by the main platform 34, i.e. assembled on top of the platform 34 to facilitate swift assembly and disassembly. Use of one or more ancillary platforms 64 may facilitate support of a technician at different radial positions within the blade 18 without needing to relocate the main platform 34. As such, access to various different radial positions above, i.e. inboard from, the platform 34 can be achieved such that a technician may work along the blade 18 whilst the blade 18 is maintained in the same vertical orientation throughout the service operation.

The ancillary platform 64 preferably comprises a substantially planar floor section 66 for supporting a technician. The floor section 66 may be discontinuous, i.e. comprising gaps, to provide a lightweight ancillary platform 64. For example, the floor section 66 may comprise one or more panels 68 of mesh or grating. As previously described, the main platform 34 preferably defines a substantially continuous work surface, and any items falling from the floor section 66 of the ancillary platform 64 may therefore be contained on the main platform 34.

The kit of parts from which the ancillary platform 64 may be assembled may be attached to the platform assembly 28 when the blade 18 is in the horizontal arrangement in some examples. This may advantageously negate or substantially minimise any requirement to hoist or lower ancillary platform parts and equipment between the hub 22 and the platform 34 when the blade 18 is arranged vertically.

Whilst not shown specifically in the accompanying figures, in some examples the wind turbine 10 may be yawed during the service operation. For example, the wind turbine 10 may be yawed in dependence on one or more factors when the rotor blade 18 is arranged to extend substantially vertically downwardly from the hub 22 for the service operation.

The wind turbine 10 may be yawed in dependence on the direction and speed of the prevailing wind, for example, to actively manage the wind load on the blade 18 during the service operation.

In advantageous examples, the work platform assembly 28 may be removed from the blade 18 following completion of the service operation. As such, the work platform assembly 28 may be referred to as a temporary work platform assembly 28. The blade 18 is preferably arranged in a substantially horizontal orientation, i.e. a 3 o'clock or 9 o'clock position, to remove the platform assembly 28 from the blade 18. The temporary work platform assembly 28 therefore facilitates improved methods of servicing a wind turbine blade 18, i.e. with increased safety and stability, without permanently increasing the weight of the blade 18.

Performing a service operation on a wind turbine blade 18 with the blade 18 extending substantially downwardly from the hub 22 has a number of advantages as described above. However, such new methods of servicing a wind turbine blade 18 also introduce new challenges not previously considered in typical methods of servicing blades 18. For example, the interior cavity 26 of the blade 18 extends downwards when the blade 18 is arranged to extend vertically downwards from the hub 22. Leaving the manhole 30 in the partition 32 uncovered to facilitate access to the interior cavity 26 for the service operation may introduce new considerations for operating safely within the blade 18 and hub 22.

Partitions 32 such as a bulkhead or a bearing plate may function as a work platform when the blade 18 is arranged to extend substantially vertically downwardly. As such, tools or other service apparatus may be located on the partition 32. In some preferred examples, the wind turbine 10 may therefore comprise a collar 70 at least partially surrounding the manhole 30 to provide a wall or barrier at or near a perimeter of the manhole 30. The collar 70 may extend upwardly from a surface of the partition 32 to block items, such as tools or other materials, from being accidentally dropped or kicked down into the blade cavity 26 through the manhole 30 when the blade 18 extends vertically downwardly from the hub 22. In particular the collar 70 may protect technicians supported on a work platform assembly 28 inside the blade 18 by blocking items from falling into the manhole 30, thereby improving the safety of the service operation.

As shown in FIG. 8, in preferred examples the collar 70 may form a substantially continuous wall or barrier around the manhole 30. In other words, the collar 70 preferably extends around a complete perimeter of the manhole 30 to ensure that no items can be accidentally kicked or dropped into the manhole 30 from any direction.

In some examples, the collar 70 may be integral with the partition 32 through which the manhole 30 extends, i.e. integral with a bulkhead or a bearing plate for example. However, in preferred examples, the collar 70 may be removable. In some examples, the collar 70 may be releasably fastened to the partition 32, for example by means of a bolted connection. As such, the collar 70 may be temporarily installed in the wind turbine 10 during the service operation. Following the service operation, the collar 70 may be subsequently removed when not in use for guarding the manhole 30. This may be preferable in examples where the wind turbine 10 comprises a pitch drive mechanism 72, such as an actuator, to ensure that the pitch drive mechanism 72 has a full range of movement within the hub 22 without clashing with the collar 70.

The collar 70 may be configured for ease of transport or delivery to location of the manhole 30 in the wind turbine 10. For example, the collar 70 may be formed of a plurality of collar sections 74 which may make carrying and maneuvering the collar 70 inside the hub 22 easier. The collar sections 74 may be connected together or arranged together on the partition 32 in some examples to form the collar 70 around the manhole 30. Further, in some advantageous examples the collar 70 may be formed of a substantially lightweight material, such as a polymer, such that the collar 70 can be transported to the manhole location and repositioned with relative ease.

In some examples, the collar 70 may comprise an upper portion 76 that is structurally reinforced. This may help to increase the structural rigidity of the collar 70 such that it can withstand the force of items and tools impacting the collar 70 without being damaged or crumpling. For example, the upper portion 76 of the collar 70 may comprise a thickened rim 78 to increase the rigidity of the collar 70.

Whilst not shown in the figures, during a service operation inside the blade 18, technicians or service personnel may be secured to the turbine 10 by a safety rope and harness. In some examples such safety ropes may be attached to the hub 22 and extend through the manhole 30 into the blade cavity 26. In examples where the wind turbine 10 comprises a collar 70 around the manhole 30, an upper edge 80 of the collar 70 may comprise a rounded cross-sectional profile to reduce friction and wear on safety ropes extending through the manhole 30.

It will be appreciated that the description provided above serves to demonstrate a plurality of possible examples of the present invention. Features described in relation to any of the examples above may be readily combined with any other features described with reference to different examples without departing from the scope of the invention as defined in the appended claims.

Further, it will be appreciated that the above description and accompanying figures are provided merely as an example. Many alternatives to the specific examples described above are therefore possible without departing from the scope of the invention as defined in the appended claims.

The invention claimed is:

1. A method of servicing a wind turbine rotor blade comprising an outer shell defining an interior cavity, the rotor blade being part of a rotor connected to a wind turbine, and the method comprising:

arranging the rotor such that the blade is in a first orientation;

installing a work platform in the interior cavity of the blade when the blade is in the first orientation;

subsequently arranging the blade in a second orientation; and using the work platform, when the blade is in the second orientation, to support a technician performing a service operation on the blade.

2. The method of claim 1, wherein the rotor blade is arranged in a 3 o'clock or 9 o'clock position in the first orientation such that the blade is substantially horizontal, and/or the rotor blade is arranged in a 6 o'clock position in the second orientation such that the blade is substantially vertical.

3. The method of claim 1, wherein the work platform is in a substantially vertical plane when the rotor blade is in the first orientation, and/or the work platform is in a substantially horizontal plane when the rotor blade is arranged in the second orientation.

4. The method of claim 1, further comprising attaching one or more tools required to perform the service operation to the platform when the rotor blade is in the first orientation.

5. The method of claim 1, further comprising arranging climbing apparatus extending between the work platform and a root end of the rotor blade when the blade is in the first orientation, and using the climbing apparatus to access the work platform when the blade is in the second orientation.

6. The method of claim 1, wherein the rotor blade comprises a spar component located in the interior cavity, and wherein the method comprises arranging the work platform between the spar component and the outer shell or an additional spar component when the blade is in the first orientation.

7. The method of claim 6, further comprising connecting the work platform to the spar component when the rotor blade is in the first orientation.

8. The method of claim 1, further comprising
attaching an ancillary platform kit to the work platform when the rotor blade is in the first orientation, and
assembling the ancillary platform above the work platform when the blade is in the second orientation.

9. The method of claim 1, further comprising removing the work platform from the interior cavity of the rotor blade after completion of the service operation.

10. The method of claim 9, further comprising arranging the rotor such that the blade is in the first orientation, and subsequently removing the work platform from the interior cavity of the rotor blade.

11. The method of claim 1, wherein installing the work platform comprises assembling the work platform from a kit of parts when the rotor blade is in the first orientation.

12. The method of claim 11, wherein the method comprises transporting the kit of parts into the interior cavity of the blade through an access opening provided at or near the root of the rotor blade.

13. The method of claim 1, further comprising yawing the wind turbine in dependence on one or more factors during the service operation when the rotor blade is in the second orientation.

* * * * *